United States Patent [19]
Grenier

[11] Patent Number: 4,586,734
[45] Date of Patent: May 6, 1986

[54] PIPE JOINT ASSEMBLY

[75] Inventor: Wilfred J. Grenier, Rutland, Mass.

[73] Assignee: General Industries, Inc., Rutland, Mass.

[21] Appl. No.: 447,747

[22] Filed: Dec. 8, 1982

[51] Int. Cl.[4] .............................................. F16L 37/08
[52] U.S. Cl. ....................................... 285/340; 285/39
[58] Field of Search ........ 285/340, 323, 345, DIG. 22

[56] References Cited

U.S. PATENT DOCUMENTS

| | | | |
|---|---|---|---|
| 2,272,811 | 2/1942 | Nathan | 285/340 X |
| 2,341,164 | 2/1944 | Shimek | 285/340 |
| 3,507,505 | 4/1970 | Muhlner et al. | 285/345 X |
| 3,679,241 | 7/1972 | Hoffmann | 285/340 |
| 3,879,065 | 4/1975 | Kobayashi | 285/340 X |
| 4,084,843 | 4/1978 | Gassert | 285/340 X |
| 4,146,254 | 3/1979 | Turner et al. | 285/340 X |
| 4,288,113 | 9/1981 | Saulnier | 285/340 X |

FOREIGN PATENT DOCUMENTS 694568 9/1964 Canada ................................ 285/340

Primary Examiner—Thomas F. Callaghan
Attorney, Agent, or Firm—Townsend & Townsend

[57] ABSTRACT

A first tubular member is coupled to a pipe fitting or the like having a specially adapted embracing tubular member thereon. The embracing member has an inner bore dimensioned for snugly receiving the first tubular member, and the inner bore is provided with first and second shoulders. An annular locking member is seated against the first shoulder within the bore and engages the first tubular member so as to prevent its withdrawal from the embracing member. A deformable annular sealing member is disposed between the locking member and the second shoulder for sealing the first tubular member to the embracing member. A rigid annular member is interposed between and engages the sealing member and the locking member and is formed to urge the locking member into tighter locking configuration when the sealing member is deformed thereagainst. An annular guard member is seated against the second shoulder within the bore and shaped to engage the sealing member and to define a concave region for receiving a portion of the sealing member under deformation.

14 Claims, 6 Drawing Figures

PIPE JOINT ASSEMBLY

BACKGROUND OF THE INVENTION

The invention relates to an improved apparatus for joining pipe or tubing to pipe fittings, valves and the like, and for disassembling the joined pipe.

Known methods for connecting a length of metal pipe or tubing to valves or pipe fittings such as elbows and tees include the use of threaded connectors, soldering, compression fitting, flaring, and welding. Non-metallic pipe, such as thermoplastic pipe, may also be joined by adhesives.

These methods are all subject to various drawbacks. Methods calling for the application of heat or force can be awkward and time consuming to practice in cramped and inaccessible areas, for example, areas in which residential plumbing is typically located. Soldering, welding and the like require the attention of a skilled worker using special tools to produce a good connection. Moreover, it is often difficult and time-consuming to disconnect a length of pipe from a fitting once they have been joined, and it is often not possible to disassemble the joint without damaging the pipe or the fitting to such an extent that they cannot later be rejoined.

Acceptable pipe joints are more difficult to make when the pipe is to carry a fluid under pressure. Even where threaded pipe and threaded connectors are used, greater skill is required to produce a stong and leakproof seal which will withstand the pressure rating of the pipe being joined. For proper sealing under pressure, washers or O-rings are often included in the joint. If the washer and pipe are made of dissimilar metals, they will sometimes undergo electrolysis in the presence of moisture in the joint or water and chemical agents flowing through the pipe. Electrolytic action leads to degradation of the washer, which can eventually cause the joint to leak and loosen the locking action of lock washers.

Some of the aforementioned drawbacks are overcome by the use of plastic pipe joined by adhesive. But plastic is unacceptable for some applications, such as hot water conduits in residential plumbing, and is difficult to connect directly to metal valve fittings without special adaptors. Moreover, once sealed with adhesive, plastic pipe joints cannot be readily undone.

SUMMARY OF THE INVENTION

The present invention provides an improved pipe joint, which is leakproof and which can be assembled and disassembled rapidly with a minimum of effort. In a pipe joint constructed according to the invention a first tubular member, for example, a length of pipe as might be used in plumbing, is joined to a pipe fitting, valve, or the like which has a specially adapted embracing tubular member thereon. The embracing member has an inner bore dimensioned for snugly receiving the first tubular member, and the bore has a pair of inner shoulders proximate its receiving end. An annular locking member is dimensioned for seating against the first shoulder and former to engage the pipe about the outer surface thereof so as to allow its insertion into the inner bore, but to prevent its withdrawal therefrom. A deformable annular sealing member for sealing the tubular member to the embracing tubular member is disposed within the bore between the first and second shoulders. An annular guard member is dimensioned to seat against the second shoulder and is shaped to define a concave region when in its seated position into which a portion of the sealing member can be deformed when the first tubular member is first inserted into the embracing tubular member. A rigid annular member is interposed between and engages the sealing member and the locking member and is formed to urge the locking member into tighter locking configuration when the sealing member is deformed against it. The guard member, sealing member, and rigid member are dimensioned so that taken together in the assembled joint they span the distance between the second shoulder and the locking member seated on the first shoulder, thereby maintaining a tight seal against the outer surface of the tubular member. The pipe joint of the present invention will also advantageously include an annular anti-rotation member disposed between the annular locking member and the first shoulder. The anti-rotation member is shaped to engage the inserted tubular member so as to prevent relative rotation within the embracing tubular member.

In the preferred embodiment the locking member and the anti-rotation member have generally matching frustoconical shapes. The inner and outer rims of the locking member are provided with slotted edges, and the inner and outer rims of the anti-rotation member are provided with angularly spaced teeth. The slotted edges of the locking member rims give those rims a springiness enhancing their gripping ability. Because of the angulation of the frustoconical shape, the rims bite into the outer surface of the first tubular member and the inner surface of the embracing tubular member at the first shoulder to prevent withdrawal of the first tubular member. Similarly, the teeth of the anti-rotation member engage the tubular members to prevent relative rotation.

It is a feature of a joint constructed in accordance with the invention that it may be quickly disassembled without damage to its component parts, thereby allowing it to be reassembled at a later time. The invention provides a device especially adapted for quickly disassembling the joint. Briefly, the device comprises a parallel-action pliers frame having two jaw members. The first jaw member includes a first bushing member formed for engaging the embracing tubular member about its periphery. The outer surface of the embracing tubular member is formed with a shoulder for engaging and providing a stop for the first bushing member. The second jaw member includes a second bushing member formed for encircling the first tubular member. The second bushing member has an operative portion which extends toward the inner bore when the second bushing member is in its encircling position. The operative portion of the second bushing member is formed to engage the locking member as the jaw members are brought together and urge the locking member away from the tubular member, thereby allowing the tubular member to be freely withdrawn from the embracing member. In the preferred embodiment the operative portion of the second bushing member has a tapered surface which engages the inner marginal angled portion of the preferred form of locking member. As the jaw members are brought together, the tapered surface causes the angled portion to spread and loosen its grip on the first tubular member.

A fuller understanding of the nature and advantages of the invention may be gained by reference to the remaining portions of the specification and to the attached drawings.

DETAILED DESCRIPTION OF THE PREFERRED EMBODIMENT

Figure 1:
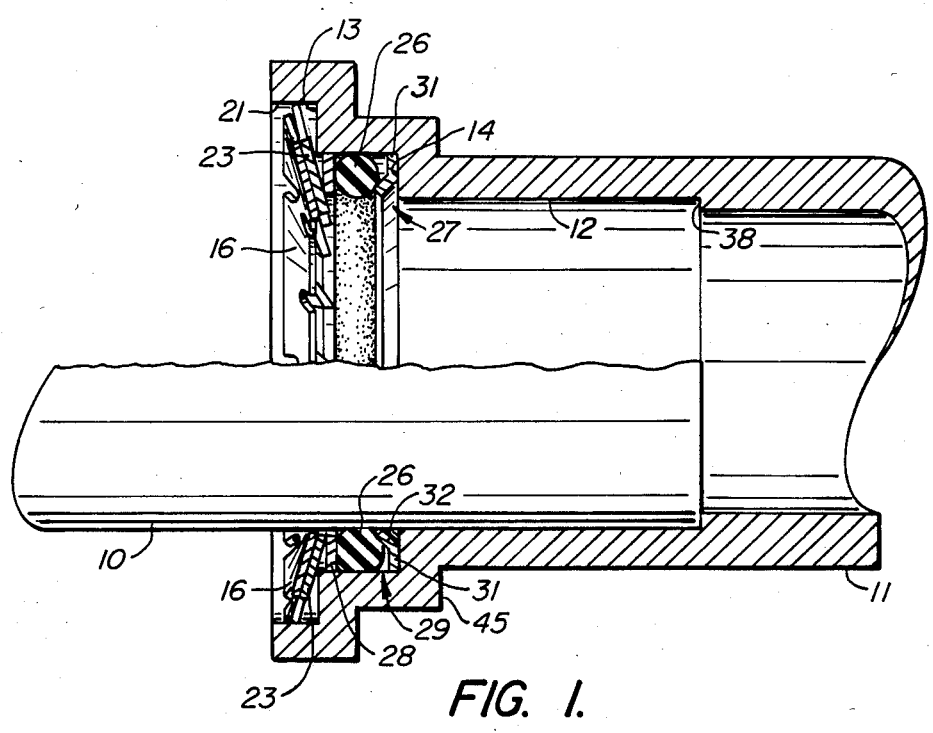
FIG. 1 is a sectional view of a pipe joint joining two tubular members in accordance with the invention, wherein the inner tubular member is partially cut away.

Reference to FIG. 1 shows a pipe joint according to the invention coupling together a first inner tubular member 10 and an embracing tubular member 11. Tubular member 10 will generally be a length of pipe or tubing such as commonly employed for the delivery of fluids. For the purposes of the invention no distinction is to be made between pipe and tubing, and as understood herein both are embraced by the word "pipe." The embracing tubular member 11 will generally form a part of a pipe fitting, such as an elbow, tee, or the like, or will form a part of some other component of a piping system, such as a valve.

The embracing member 11 has an inner bore 12 having an inside diameter equal to the outside diameter of tubular member 10 with allowance made for clearance so that the end of member 10 will be snugly received within embracing member 11. The embracing member 11 is further provided with inner shoulders 13 and 14, which are spaced apart a predetermined distance, as is explained more fully hereinbelow.

An end of tubular member 10 is secured within embracing member 11 by annular locking member 16. In the preferred embodiment illustrated in FIG. 2A locking member 16 is of a generally frustoconical shape having inner and outer marginal portions 17 and 18, respectively, provided with circumferentially spaced slots 19 to allow for constriction and spreading of the marginal portions. In the assembled joint the angulation of the frustoconical shape causes the outer marginal portion 18 to bite into the inner wall 21 of embracing member 11 adjacent shoulder 13. Similarly, the inner marginal portion 17 bites into the outer wall of the inserted tubular member 10.

In the preferred embodiment the joint also includes an annular anti-rotation member 23 having a frustoconical shape matching that of locking member 16, so that the surface of locking member 16 will engage the surface of anti-rotation member 23 when the two are in the overlying disposition illustrated in FIG. 1. Anti-rotation member 23 is provided with an inwardly extending set of teeth 24 and an outwardly extending set of teeth 25 about its inner and outer margins, respectively. When anti-rotation member 23 seats against shoulder 13, the teeth grasp the adjacent walls thereby securing the tubular members against relative rotational movement. Although the preferred embodiment calls for anti-rotation member 23 to be positioned between locking member 16 and shoulder 13, the pipe joint can also be constructed without the anti-rotation member.

A tight seal between tubular member 10 and embracing member 11 is provided by sealing member 26 in cooperation with annular guard member 27, annular member 28, anti-rotation member 23, and locking member 16. Sealing member 26 is advantageously provided by a deformable O-ring, which has an inside diameter slightly smaller than the outside diameter of tubular member 10.

Annular guard member 27 is shaped to seat against shoulder 14 and defines a concave region 29 to accommodate the deformations of sealing member 26 when the pipe 10 is first inserted into the embracing member 11. In the preferred embodiment guard member 27 has a flat portion 31, which seats against shoulder 14. Along the inner margin of flat portion 31 is a second portion 32 which is angled to extend toward the pipe-receiving end of embracing member 11, that is, toward shoulder 13 and locking member 16.

Sealing member 26 seats against the guard member 27. In the preferred embodiment annular member 28 is interposed between sealing member 26 and anti-rotation member 23. Annular member 28 is formed of a rigid material, for example, a rigid plastic, and has an inside diameter slightly larger than the outside diameter of tubular member 10, so that member 28 will generally not contact the inserted end of tubular member 10, but will engage the inner marginal portion of the inner teeth 24 of anti-rotation member 23.

To provide a tight seal and to prevent damage to O-ring 26 when the joint is repeatedly assembled and disassembled, it is important that guard member 27, O-ring 26 and annular member 28 engage one another and span the predetermined distance between the innermost shoulder 14 and anti-rotation member 23 seated on the outermost shoulder 13.

Figure 2A:
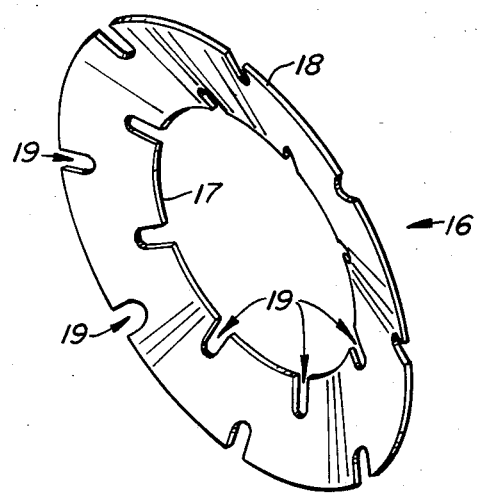
FIG. 2A is a perspective view of the locking member shown in FIG. 1.
Figure 2B:
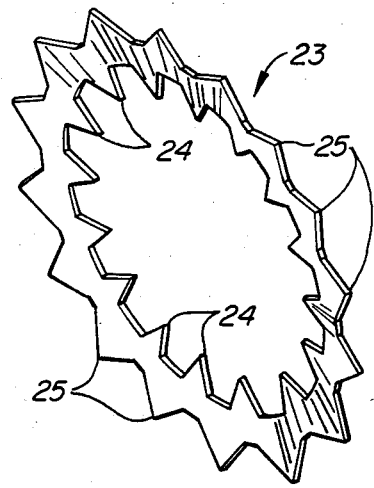
FIG. 2B is a perspective view of the anti-rotation member shown in FIG. 1.
Figure 3A:
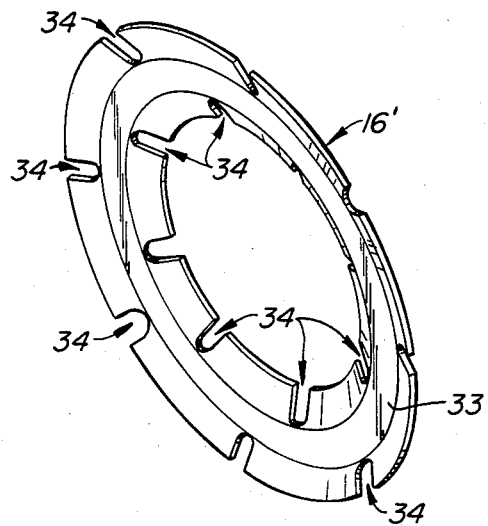
FIGS. 3A and 3B are perspective views of an alternative embodiment of locking member and anti-rotation member, respectively.
Figure 3B:
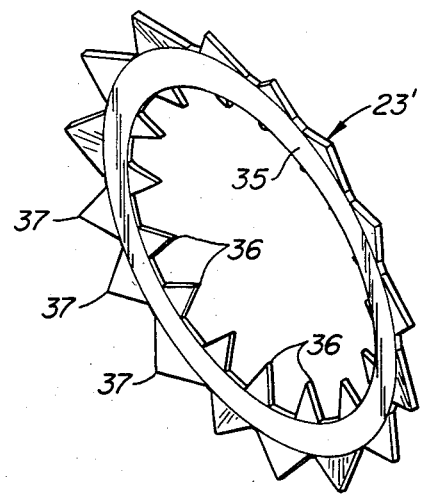

As an alternative construction the locking member and anti-rotation member can be formed as shown in FIGS. 3A and 3B. Instead of a frustoconical shape locking member 16' has a flat portion 33 and second and third portions along the outer and inner margins of the flat portion, respectively. The second and third portions have slotted edges 34 and are angled with respect to the flat portion 33 in opposite directions from one another. When locking member 16' is in its seated position, the outer portion extends toward the pipe-receiving end of the inner bore 12, and the inner portion extends in the opposite direction and protrudes slightly into the bore 12 so as to engage the first tubular member as that member is inserted. The anti-rotation member 23' illustrated in FIG. 3B has an angulated construction to match that of locking member 16'. A central flat annular portion 35 has inner and outer sets of teeth 36 and 37, respectively, angled in opposite directions from one another. The frustoconical construction of FIGS. 2A and 2B is preferred over the angled construction of FIGS. 3A and 3B because it can be manufactured more economically.

In assembling the joint, the following steps take place. First, pipe 10 is cut square to its length at one end, and the outer leading edge is deburred. The squared-off end is then inserted into embracing member 11. Inner bore 12 may be provided with an inner shoulder 38, which acts as a stop for the inserted end of pipe 10. Stop 38 is positioned a sufficient axial distance within embracing member 11 to provide for a firm coupling of the two members 10 and 11. The longer the pipe 10 and the greater its diameter, the greater the distance which pipe 10 should be inserted into embracing member 11 for a firm connection. It is recommended that stop 38 be axially spaced from shoulder 14 a distance at least as great as the diameter of the pipe 10.

As the end of pipe 10 meets the inner marginal portions of locking member 16 and anti-rotation member 23, or of locking member 16 alone if no anti-rotation member is used, the slotted edge of the locking member spreads, allowing pipe 10 to continue its movement into bore 12. As the slotted edge spreads, it urges the inner set of teeth 24 of anti-rotation member 23 away from the outer wall of pipe 10. This engagement is an important feature of the relationship between the locking member and anti-rotation member. If the locking member or anti-rotation member were so constructed that the teeth 24 would not be urged away from pipe 10, then the teeth would score the wall of the pipe as it is inserted. The score marks could then reduce the effectiveness of sealing member 26.

Once the inserted end of pipe 10 meets stop 38 and is brought to a halt, the inner marginal portion of locking member 16 will be under spring tension against the outer surface of pipe 10. Locking member 16 is preferably formed of a spring material with a hardness greater than pipe 10 so as to bite into the outer surface of the pipe.

Pipe 10 is now locked securely in place. A tug on pipe 10 to extract it from the joint will only cause the inner marginal portion to bite more deeply into the outer surface and correspondingly the outer marginal portion to bite more deeply into the inner wall 21. The rigid annular member 28 prevents the O-ring seal from being deformed or pressed against the inwardly facing surface of anti-rotation member 23. In particular, when a fluid flows through the assembled joint under pressure, the joint will experience a force tending to separate the two tubular members. Any such force tending to extract member 10 from member 11 will be transmitted through O-ring 26 to rigid annular member 28. The inner rim of member 28 will then be caused to bear against the inwardly extending portion of anti-rotation member 23 and hence against locking member 16, thereby increasing the gripping power of these members against the outer surface of pipe 10.

It is found that if O-ring 26 were to be seated directly against shoulder 14, then as the end of pipe 10 is inserted into bore 12, the O-ring would be subject to a shearing stress between the outer surface of pipe 10 and the inner surface of bore 12. Such stress can damage the O-ring reducing its sealing ability. The shearing stress is avoided in the present invention by the cooperation of guard member 27 with sealing member 26. As pipe 10 is inserted, the resulting deformation of sealing member 26 is directed into the concave region 29 defined by guard member 27, and no damaging shearing action takes place.

In piping systems carrying water with dissolved electrolytes, metallic washers and other components formed of a metal different from that of the piping have a tendency to undergo electrolysis in the presence of the water. In the present invention, however, the arrangement of the various members serves to prevent electrolysis from occurring. Sealing member 26 is positioned on the inner side of locking member 16 and anti-rotation member 23, so that these members are effectively sealed off from any moisture. By virtue of the disposition of the members within the joint dictated by the invention, the sealing member, locking member, and anti-rotation member cooperate with one another so as to form a firm connection and tight seal, yet are sufficiently separated from one another to prevent corrosion-inducing moisture from reaching the locking and anti-rotation members.

Figure 4:
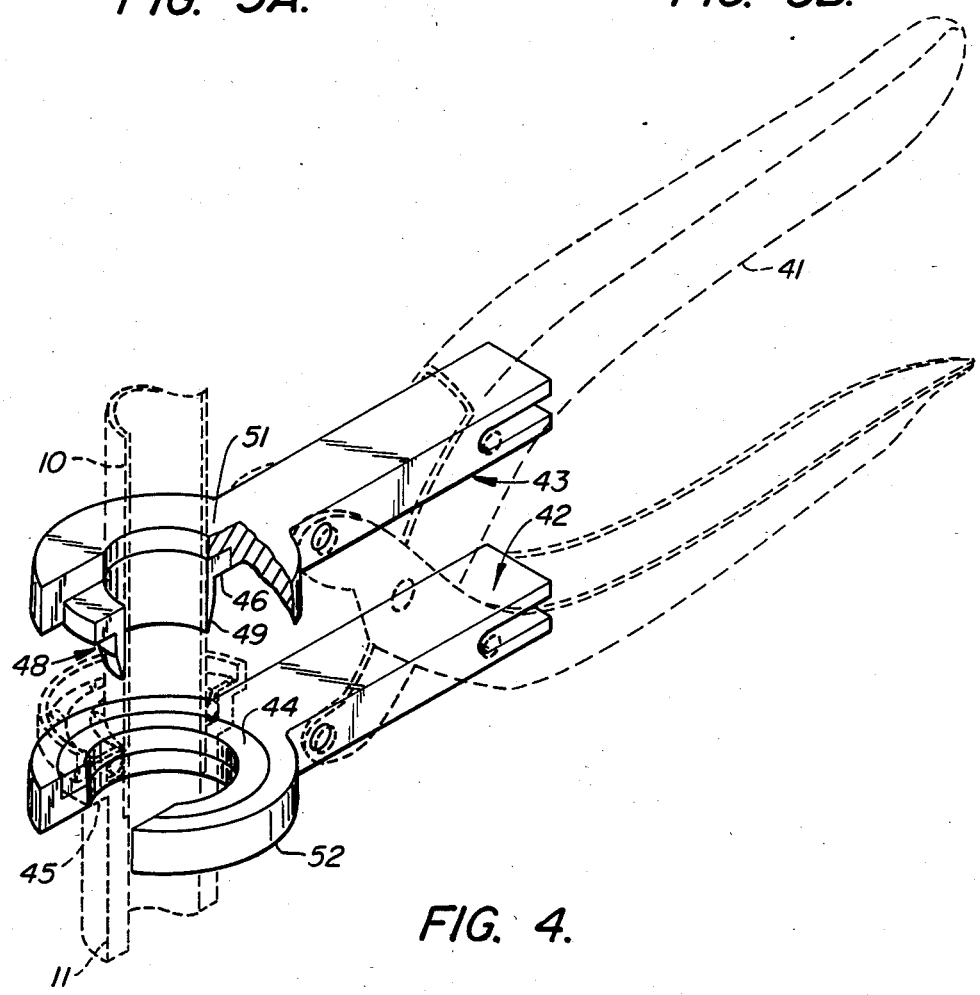
FIG. 4 is a cut-away perspective view of a device constructed in accordance with the invention for disassembling the joint of FIG. 1; the joint is shown in phantom.

FIG. 4 shows a device particularly adapted for disassembling the above-described joint. The device includes a parallel-action pliers frame 41 with jaw members 42 and 43. Jaw member 42 includes bushing member 44, which is formed to engage embracing member 11 at its periphery. Embracing member 11 is provided with an outside shoulder 45 against which bushing 44 bears. Jaw member 43 includes bushing member 46, which is formed to encircle tubular member 10. Bushing 46 has an operative portion 48 which extends toward inner bore 12 and which is formed to engage locking member 16 and anti-rotation member 23 and cause them to release tubular member 10. In particular, the operative portion 48 of bushing 46 has a tapered surface 49 which is formed to engage the inner marginal portion 22 of locking member 16 and urge it away from the outer surface of tubular member 10.

In the preferred embodiment jaw members 42 and 43 have U-shaped portions 51 and 52, which have recessed regions for receiving bushings 44 and 46. The bushing members themselves are demountable from the jaw members. Also in the preferred embodiment bushing member 44 has a U-shape for easy installation about embracing member 11. Bushing member 46 is split into two separable portions, preferably two halves, to permit easy encircling installation about pipe 10. The jaw members 42 and 43 may themselves be demountable from the parallel-action pliers frame 41. In this manner, the bushings or the jaw members or both may be changed to fit all sizes of pipe or fitting ends.

The pipe joint is disassembled with the above-described device in the following manner. First, the two halves of the proper-sized bushing 46 are placed around pipe 10. A proper-sized bushing 44 is placed around embracing member 11 at shoulder 45. The U-shaped portions 51 and 52 of jaw member 42 and 43 are then installed on either side of the pipe joint and gradually brought together by the parallel action of the pliers frame 41 until bushing member 44 and 46 seat into the recesses provided therefor in the U-shaped portions. Jaw members 42 and 43 continue to move together until tapered surface 49 engages locking member 16 and urges the inner portion 22 away from pipe 10. Pipe 10 may then be freely withdrawn from the joint.

In summary, the present invention provides a pipe joint which can be assembled very quickly merely by inserting a pipe end into an embracing member constructed in accordance with the invention. The joint achieved is sturdy, leakproof, and not subject to weakening due to gradual electrolytic corrosion. Moreover, different types of pipe, such as plastic pipe and metal pipe fittings, can be readily joined by means of the invention. With the special device provided by the invention the joint can be disassembled almost as quickly as it can be assembled.

While the above provides a full and complete description of the preferred embodiments of the invention, various modifications, alternate constructions, and equivalents may be employed without departing from the true spirit and scope of the invention. For example, while guard member 27, sealing member 26, rigid annular member 28, locking member 16, and anti-rotation member 23 have been described as separable components, these members can also be permanently fixed into position within embracing member 11. This can be accomplished by locking and anti-rotation members which have no outer marginal portions contacting inner wall 21, but rather which are permanently secured to shoulder 13 by welding, soldering, or the like.

Therefore, the above description and illustrations should not be construed as limiting the scope of the invention, which is defined by the appended claims.

What is claimed is:

1. A coupling assembly for use in connecting a first tubular member at a first end thereof to a component of a piping system, said assembly comprising;

an embracing tubular member on said component for receiving said first tubular member, said embracing member having an inner bore dimensioned for snugly receiving said first end, said bore having first and second inner shoulders proximate the receiving end thereof;

an annular locking member of generally frustoconical shape dimensioned to abut against said first shoulder, said locking member having an outer rim engaging an inner wall of said embracing member and an inner rim extending toward said second shoulder and protruding slightly into said bore when in seated position, said inner and outer rims having slotted edges;

an annular guard member having a flat portion dimensioned to seat against said second shoulder and a second portion angled to extend toward said receiving end when said guard member is in seated position;

an annular sealing member dimensioned to abut against said guard member; and a rigid annular member dimensioned to abut against said sealing member and formed to urge said locking member into tighter locking configuration when said sealing member is deformed thereagainst;

wherein said first and second shoulders are spaced apart a characteristic distance so that said locking, rigid, sealing, and guard members engage one another when in their seated and abutting positions.

2. The coupling asembly of claim 1, further comprising an annular anti-rotation member having frustoconical shape matching that of said locking member, said anti-rotation member being dimensioned to abut against said first shoulder and having an inner set of teeth and an outer set of teeth angularly spaced about the inner and outer margins thereof, said outer teeth being disposed to engage an inner wall of said embracing tubular member and said inner teeth being disposed to engage said first tubular member when said anti-rotation member is in abutting position against said first shoulder and said first tubular member is in inserted position within said embracing tubular member.

3. The coupling assembly of claim 2, wherein said bore has a third shoulder spaced axially apart from said second shoulder and dimensioned to provide a stop for said first end.

4. An assembly for use in connecting a first tubular member to a pipe fitting or the like having an embracing tubular member thereon, said embracing member having an inner bore dimensioned for snugly receiving said first tubular member, said bore having first and second inner shoulders proximate the receiving end thereof and spaced apart a predetermined distance, wherein said assembly comprises:

an annular anti-rotation member dimensioned to abut against said first shoulder and formed to engage said first tubular member so as to prevent rotation thereof within said embracing tubular member;

an annular locking member shaped and dimensioned to seat against said anti-rotation member and formed to engage said first tubular member so as to allow insertion thereof into said bore and to prevent withdrawl thereof from said bore;

a deformable annular sealing member for sealing said first member to said embracing member;

an annular guard member dimensioned to seat against said second shoulder and shaped to define a concave region when in seated position for receiving a portion of said sealing member urged into said concave region when said first tubular member is inserted into said bore; and a rigid annular member interposed between and engaging said sealing member and said anti-rotation member and formed to urge said anti-rotation member and said locking member into tighter engagement with said first tubular member when said sealing member is deformed thereagainst;

wherein said guard, sealing, and rigid annular members are further dimensioned to span said predetermined distance from said second shoulder to said anti-rotation member at said first shoulder when in their seated and abutting positions.

5. The assembly of claim 4, wherein said anti-rotation member and said locking member are of matching frustoconical shape, said anti-rotation member having an inner set of teeth and an outer set of teeth angularly spaced about the inner and outer margins thereof for engaging an outer wall of said first tubular member and an inner wall of said embracing tubular member, respectively, to prevent relative rotation, and said locking member having inner and outer slotted rims for engaging said outer and inner walls to allow insertion of said first tubular member into said embracing tubular member and to prevent withdrawal therefrom, said inner rim of said locking member overlying said inner margin of said anti-rotation member so as to urge said inner set of teeth away from said outer wall as said first tubular member is inserted thereby preventing scoring of said outer wall upon insertion.

6. The assembly of claim 4, wherein said annular guard member is provided by a member having a flat portion for seating against said second shoulder and a second portion along the inner margin of said flat portion angled to extend toward said receiving end when in seated position.

7. A pipe joint comprising:

a first tubular member;

an embracing tubular member having an inner bore snugly receiving said first tubular member, said inner bore having first and second shoulders;

an annular locking member of generally frustoconical shape abutting against said first shoulder and having an outer rim engaging an inner wall of said embracing member and an inner rim extending toward said second shoulder and protruding slightly into said bore to engage said first tubular member, said inner and outer rims having slotted edges for allowing spreading and constriction thereof, whereby said locking member prevents relative movement tending to separate said first tubular member from said embracing tubular member;

a deformable annular sealing member disposed between said first and second shoulders for sealing said first tubular member to said embracing member;

a rigid annular member interposed between and engaging said sealing member and said locking member and formed to urge said locking member into tighter locking configuration when said sealing member is deformed thereagainst; and an annular guard member seated against said second shoulder and shaped to define a concave region for receiving a portion of said sealing member under deformation.

8. A pipe joint comprising:

a first tubular member;

an embracing tubular member having an inner bore snugly receiving said first tubular member, said inner bore having first and second shoulders;

an annular locking member having a flat portion abutting against said first shoulder, a first portion along the inner margin of said flat portion having a slotted edge and angled toward said second shoulder and protruding slightly into said bore, and a second portion along the outer margin of said flat portion having a slotted edge and angled opposite to said first portion, whereby said locking member prevents relative movement tending to separate said first tubular member from said embracing tubular member;

a deformable annular sealing member disposed between said first and second shoulders for sealing said first tubular member to said embracing member;

a rigid annular member interposed between and engaging said sealing member and said locking member and formed to urge said locking member into tighter locking configuration when said sealing member is deformed thereagainst; and an annular guard member seated against said second shoulder and shaped to define a concave region for receiving a portion of said sealing member under deformation.

9. A pipe joint comprising:

a first tubular member;

an embracing tubular member having an inner bore snugly receiving said first tubular member, said inner bore having first and second shoulders;

an annular anti-rotation member abutting against said first shoulder and engaging said first tubular member about the outer surface thereof and said embracing tubular member about the inner surface thereof, said anti-rotation member being shaped so as to prevent rotation of said first tubular member within said embracing tubular member;

an annular locking member abutting against said anti-rotation member, said locking member having an outer rim engaging said embracing tubular member about said inner surface thereof and an inner rim extending toward said second shoulder and protruding slightly into said bore to engage said first tubular member about said outer surface thereof, said locking member being shaped so as to prevent relative movement tending to separate said first tubular member from said embracing tubular member;

a deformable annular sealing member disposed between said first and second shoulders for sealing said first tubular member to said embracing member;

a rigid annular member interposed between and engaging said sealing member and said anti-rotation member and formed to urge said anti-rotation member against said locking member into tighter locking configuration when said sealing member is deformed thereagainst; and an annular guard member seated against said second shoulder and shaped to define a concave region for receiving a portion of said sealing member under deformation.

10. The pipe joint of claim 9, wherein said annular anti-rotation member is provided with an inner set of teeth angularly spaced about the inner margin of said anti-rotation member, said teeth extending toward said second shoulder and protruding slightly into said bore to engage said first tubular member.

11. A coupling assembly for use in connecting a first tubular member at a first end thereof to a component of a piping system, said assembly comprising:

an embracing tubular member on said component for receiving said first tubular member, said embracing member having an inner bore snugly receiving said first end, said inner bore having first and second inner shoulders proximate the receiving end thereof;

an annular locking member of generally frustoconical shape abutting against said first shoulder and having an outer rim engaging an inner wall of said embracing member and an inner rim extending toward said second shoulder and protruding slightly into said bore to engage said first tubular member, said inner and outer rims having slotted edges for allowing spreading and constriction thereof, whereby said locking member prevents relative movement tending to separate said first tubular member from said embracing tubular member;

a deformable annular sealing member disposed between said first and second shoulders for sealing said first tubular member to said embracing member;

a rigid annular member interposed between and engaging said sealing member and said locking member and formed to urge said locking member into tighter locking configuration when said sealing member is deformed thereagainst; and an annular guard member seated against said second shoulder and shaped to engage said sealing member and to define a concave region for receiving a portion of said sealing member under deformation.

12. A coupling assembly for use in connection a first tubular member at a first end thereof to a component of a piping system, said assembly comprising:

an embracing tubular member having an inner bore snugly receiving said first tubular member, said inner bore having first and second shoulders;

an annular locking member having a flat portion abutting against said first shoulder, a first portion along the inner margin of said flat portion having a slotted edge and angled toward said second shoulder and protruding slightly into said bore, and a second portion along the outer margin of said flat portion having a slotted edge and angled opposite to said first portion, whereby said locking member prevents relative movement tending to separate said first tubular member from said embracing tubular member;
a deformable annular sealing member disposed between said first and second shoulders for sealing said first tubular member to said embracing member;
a rigid annular member interposed between and engaging said sealing member and said locking member and formed to urge said locking member into tighter locking configuration when said sealing member is deformed thereagainst; and
an annular guard member seated against said second shoulder and shaped to define a concave region for receiving a portion of said sealing member under deformation.

13. A coupling assembly for use in connection a first tubular member at a first end thereof to a component of a piping system, said assembly comprising:
an embracing tubular member having an inner bore snugly receiving said first tubular member, said inner bore having first and second shoulders;
an annular anti-rotation member abutting against said first shoulder and engaging said first tubular member about the outer surface thereof and said embracing tubular member about the inner surface thereof, said anti-rotation member being shaped so as to prevent rotation of said first tubular member within said embracing tubular member;
an annular locking member abutting against said anti-rotation member, said locking member having an outer rim engaging said embracing tubular member about said inner surface thereof and an inner rim extending toward said second shoulder and protruding slightly into said bore to engage said first tubular member about said outer surface thereof, said locking member being shaped so as to prevent relative movement tending to separate said first tubular member from said embracing tubular member;
a deformable annular sealing member disposed between said first and second shoulders for sealing said first tubular member to said embracing member;
a rigid annular member interposed between and engaging said sealing member and said anti-rotation member and formed to urge said anti-rotation member against said locking member into tighter locking configuration when said sealing member is deformed thereagainst; and
an annular guard member seated against said second shoulder and shaped to define a concave region for receiving a portion of said sealing member under deformation.

14. The coupling assembly of claim 13, wherein said annular anti-rotation member is provided with an inner set of teeth angularly spaced about the inner margin of said anti-rotation member, said teeth extending toward said second shoulder and protruding slightly into said bore to engage said first tubular member.

* * * * *